United States Patent
Cerbati et al.

[15] 3,687,955
[45] Aug. 29, 1972

[54] THE TROPINE ESTER OF 2-PHENYL-4-PENTYNOIC ACID

[72] Inventors: Guido Cerbati, Via C. Loquez, 7 Pisa; Luigi Turbanti, Via B. da Padule, 10 Pisa, both of Italy

[22] Filed: Aug. 6, 1968

[21] Appl. No.: 750,479

[30] Foreign Application Priority Data

Aug. 9, 1967 Italy...................19363 A/67

[52] U.S. Cl. ........260/292, 260/247.2 B, 260/268 R, 260/482 R, 260/486 R, 260/293.72, 260/293.81, 424/248, 424/250, 424/265, 424/267, 424/311, 424/314
[51] Int. Cl. ............................................C07d 43/06
[58] Field of Search......................................260/292

[56] References Cited

UNITED STATES PATENTS 1,611,978  12/1926  Wolffenstein..........260/295.5

*Primary Examiner*—Alan L. Rotman
*Attorney*—Steinberg & Blake

[57] ABSTRACT

A series of amino esters of 4-pentynoic acid substituted in 2-position with propyl or phenyl, as well as acid addition salts and quaternary compounds thereof. The compounds are effective therapeutic agents having antispasmatic action as well as a regulatory effect on gastric and intestinal hyperkinesia. The invention also relates to methods of producing these compounds.

4 Claims, No Drawings

THE TROPINE ESTER OF 2-PHENYL-4-PENTYNOIC ACID

The present invention relates to certain amino-esters of substituted 4-pentynoic-2-acid, their salification products and also to methods of manufacturing such compounds. The invention relates more specifically to amino-esters of 2-phenyl-4-pentynoic acid and 2-propyl-4-pentynoic acid.

The acid products have been found useful therapeutic agents, having a marked antispasmodic effect associated with a regulatory effect on gastric and intestinal hyperkinesia, and an anti-ulcer activity.

The products provided by the invention are expressed by the following general formula:

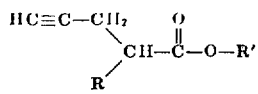

wherein $R = -C_3H_7$ or $-C_6H_5$
and R' is a radical chosen from the group comprising:

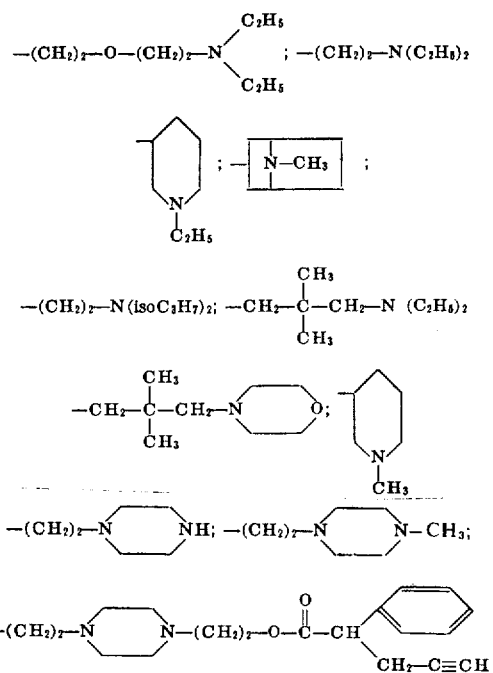

The invention also relates to salts of these basic esters with certain inorganic and organic acids (hydrochloric, sulphuric, citric, maleic, tartaric, acids) and to quaternarization compounds of said basic esters with alkyl halides (such as $CH_3Br$, $C_2H_5Br$, $C_4H_9Br$) of the type $C_nH_mX$ wherein $C_nH_m$ represents a branched or linear aliphatic chain, saturated or unsaturated, with one to 10 carbon atoms, and X represents one atom of chlorine, bromine or iodine.

The preparation of the products to which the invention relates involves the production of certain intermediates not known in the literature, in particular of 2-propyl-4-pentynoic acid and of the 2-phenyl-4-pentynoate of B-bromoethyl: 2-phenyl-4-pentynoic acid is however known. The preparation also involves the conversion of said products into the corresponding amino-esters by three different methods which also form part of the present invention. Finally, by a method known in the literature, the amino-esters may be converted into the corresponding products of salification and quaternization. One of the general methods of obtaining aminoesters, hereinafter called "Method A," comprises the hot reaction in an organic solvent (benzol, toluol, xylol) of the chloride of 2-phenyl- or 2-propyl-4-pentynoic acid with the potassium or sodium salts of an amino-alcohol chosen from the following:- 2-diethylamino-ethanol; N-ethyl-3-hydroxypiperidine; tropine; 2-diisopropyl-aminoethanol; N-methyl-3-hydroxy-piperidine; 3(N-morpholine)-2,2-dimethyl-propanol;3-diethyl-amino-2,2-dimethyl-propanol; N-methyl-N-(2-hydroxyethyl)-piperazine, N,N-bis-(2-hydroxyethyl)-piperazine; 2-(2'-diethylaminoethoxy)-ethanol.

Another general method, indicated as "method B," comprises the hot reaction in a polar solvent of the alkaline salt of 2-phenyl- or 2-propyl-4-pentynoic acid with an amino-alkylhalide chosen from the group comprising:- 2diethylamino ethyl chloride; N-ethyl-3-chloro-piperidine; 2di-isopropyl-amino-ethyl-chloride; N-methyl-3-chloro-piperidine 3(N-morpholine)-2,2-dimethyl-propyl-chloride; 3-di-ethyl-amino-2,2-dimethyl propyl-chloride; N-methyl-N'-(-2-chloro ethyl)-piperazine; N,N'-bis-(2-chloro ethyl)-piperazine.

A third method, indicated as "method C" comprises the reaction under pressure of the bromo-alkyl-ester of 2-phenyl or 2-propyl-4-pentynoic acid with a compound chosen from the group:- dietmylamine; di-isopropylamine; piperazine; N-methylpiperazine; morpholine and diethylaminoethanol.

The antispasmodic effect was determined on segments of various isolated organs, and it was noted that most of the experimental products inhibit or prevent the contractions due to the use of spasmogenics of a hormonal, homoral or other nature. With some of the experimental compounds, this inhibitory or preventative activity was found even at concentration of $1 \times 10^{-5}$ and $1 \times 10^{-7}$.

The antispasmodic activity of the compounds of the invention is illustrated in the following table which gives in terms of concentration the $ED_{50}$ inhibiting the spasm of isolated organs (terminal ileum of a guinea-pig, ascending colon of rat, rat jejunum, rat uterus), the spasm being produced by certain spasmogenic agents such as histamine (BIST), 5-hydroxy-triptamine (5HT), acetylcholine (ACH), barium chloride, oxytocin, and plasmatic bradychinine (SRS). Together with certain products of the invention, listed by numerical reference but whose formulas will be defined below, the table gives by way of comparison some commercial antispasmodics. The corresponding $ED_{50}$ values show that the new compounds can be advantageously compared with the latter.

Table of ED50 values expressed in Gm/ml of bath.

Spasmogenic materials

|       | ACH | | | BaCl |
|---|---|---|---|---|
|       | 0.15 µg/ml inhibiting | 0.15 µg/ml relaxing | 10 µg/ml relaxing | 250 µg/ml |
| 50229 | $1 \times 10^{-6}$ | $2.8 \times 10^{-7}$ | $8 \times 10^{-5}$ | $2.3 \times 10^{-5}$ |
| 50268 | $1 \times 10^{-6}$ | $5 \times 10^{-7}$ | $2.5 \times 10^{-5}$ | $1.3 \times 10^{-6}$ |
| 50304 | $1.2 \times 10^{-7}$ | $8.5 \times 10^{-6}$ | $3 \times 10^{-4}$ | $3.5 \times 10^{-6}$ |
| 50302 | $3 \times 10^{-6}$ | $7.5 \times 10^{-7}$ | $6.5 \times 10^{-6}$ | $1.1 \times 10^{-}$ |
| 50276 | $2.3 \times 10^{-6}$ | $6 \times 10^{-7}$ | $2.3 \times 10^{-5}$ | $2.5 \times 10^{-6}$ |

| | 5HT 1 μg/ml | Histamine 0.01 μg/ml | Oxytocin 0.01 =g/ml | SRS 0.1 μg/ml |
|---|---|---|---|---|
| 50307 | $1.1 \times 10^{-6}$ | $8 \times 10^{-7}$ | $5 \times 10^{-6}$ | $1.1 \times 10^{-6}$ |
| 50303 | $6.5 \times 10^{-7}$ | $4 \times 10^{-6}$ | $1.2 \times 10^{-6}$ | $7.5 \times 10^{-6}$ |
| 50303MJ | $1 \times 10^{-7}$ | $1.2 \times 10^{-8}$ | $5 \times 10^{-7}$ | $<1 \times 10^{-6}$ |
| 50314 | $8 \times 10^{-6}$ | $6.5 \times 10^{-7}$ | $1.1 \times 10^{-6}$ | $4 \times 10^{-6}$ |
| 50321 | $7 \times 10^{-6}$ | $7.5 \times 10^{-6}$ | $2.7 \times 10^{-6}$ | $<1 \times 10^{-6}$ |
| 50315 | $8 \times 10^{-6}$ | $2.5 \times 10^{-6}$ | $7.5 \times 10^{-6}$ | $1 \times 10^{+}$ |
| Atropine | $2.3 \times 10_-$ | $3 \times 10^{-6}$ | $2.5 \times 10^{-6}$ | $<1 \times 10^{+}$ |
| Deserril | $7.8 \times 10^{-7}$ | $1.2 \times 10^{-6}$ | $3.8 \times 10^{-5}$ | $1.2 \times 10^{-6}$ |
| Antistin | $3.5 \times 10^{-6}$ | $5 \times 10^{-6}$ | $4.4 \times 10^{-6}$ | $1.1 \times 10^{-6}$ |
| Buscopan | $1 \times 10^{-}$ $\times 10^{-7}$ | $2.8 \times 10^{-7}$ $5 \times 10^{-6}$ | $5 \times 10^{-7}$ | $5$ $1 \times 10^{-5}$ |
| Spasmamina | $5 \times 10^{-6}$ $1.1 \times 10^{-6}$ | $4.2 \times 10^{-6}$ | $4.2 \times 10^{-6}$ | $2.5 \times 10^{-6}$ |
| Papaverina | $5 \times 10^{-6}$ $\times 10^{-6}$ | $1.1 \times 10^{-6}$ | $1.2 \times 10^{-6}$ | $1.2$ $2.5 \times 10^{-6}$ |
| Gemora | $2.3 \times 10^{-6}$ | $2 \times 10^{-6}$ | $1.2 \times 10^{-5}$ | $5 \times 10^{-}$ |
| Cantil | $1 \times 10^{-6}$ $1.1 \times 10^{-6}$ | $8 \times 10^{-6}$ | $1.1 \times 10^{-6}$ | $<1 \times 10^{-6}$ |

| | 5HT 1 μg/ml | Histamine 0.01 μg/ml | Oxytocin 0.01 =g/ml | SRS 0.1 μg/ml |
|---|---|---|---|---|
| 50229 | $5 \times 10^{-6}$ | $7.5 \times 10^{-7}$ | $5 \times 10^{-6}$ | $2.5 \times 10^{-6}$ |
| 50268 | $3 \times 10^{-5}$ | $1.2 \times 10^{-6}$ | $1.2 \times 10^{-6}$ | $2.5 \times 10^{-6}$ |
| 50304 | $4 \times 10^{-5}$ | $4 \times 10^{-6}$ | $7.5 \times 10^{-6}$ | $9 \times 10^{-6}$ |
| 50302 | $2 \times 10^{-6}$ | $2.5 \times 10^{-6}$ | $2.7 \times 10^{-6}$ | $3 \times 10^{-6}$ |
| 50276 | $1.2 \times 10^{-6}$ | $2.5 \times 10^{-6}$ | $2.5 \times 10^{-6}$ | $2.5 \times 10^{-6}$ |
| 50307 | $2 \times 10^{-6}$ | $6 \times 10^{-6}$ | $6 \times 10^{-6}$ | $8.5 \times 10^{+6}$ |
| 50303 | $2.5 \times 10^{-5}$ | $7.7 \times 10^{8}$ | $8 \times 10^{-6}$ | $8 \times 10^{-6}$ |
| 50303MJ | $1 \times 10^{-6}$ | $4.5 \times 10^{-5}$ | $7.5 \times 10^{6}$ | $3 \times 10^{-6}$ |
| 50314 | $8 \times 10^{-6}$ | $2.5 \times 10^{-6}$ | $1.1 \times 10^{-6}$ | $1.2 \times 10^{-6}$ |
| 50321 | $5.5 \times 10^{-6}$ | $4 \times 10^{-5}$ | $1.2 \times 10^{-6}$ | $2.5 \times 10^{-6}$ |
| 50315 | $7.5 \times 10^{-5}$ | $5 \times 10^{-6}$ | $2.8 \times 10^{-6}$ | $2.5 \times 10^{-6}$ |
| Atropine | $5.5 \times 10^{-5}$ | $5 \times 10^{-6}$ | $1 \times 10^{-5}$ | $3.5 \times 10^{-5}$ |
| Deserril | $1'1.1 \times 10^{-5}$ $10^{-5}$ | $<1 \times 10^{-5}$ | $5 \times 10^{-5}$ | $1.2 \times$ |
| Antistin | $1.2 \times 10^{-6}$ | $2.5 \times 10^{-6}$ | $1 \times 10^{-4}$ | $2.3 \times 10^{-6}$ |
| Buscopan | $1 \times 10^{-5}$ | $7.8 \times 10^{-6}$ | $3.5 \times 10^{-6}$ | $5.5 \times 10^{-6}$ |
| Spasmamina | $3.2 \times 10^{-6}$ | $2 \times 10^{-6}$ | $2.5 \times 10^{-6}$ | $5.5 \times 10^{-6}$ |
| Papaverina | $1.1 \times 10^{-5}$ | $7.5 \times 10^{-6}$ | $3.5 \times 10^{-6}$ | $1 \times 10^{-6}$ |
| Gemora | $1.1 \times 10^{-5}$ | $1.7 \times 10^{-6}$ | $2.5 \times 10^{-6}$ | $2.4 \times 10^{-6}$ |
| Cantil | $<1 \times 10^{-5}$ | $3.5 \times 10^{-7}$ | $1.3 \times 10^{-5}$ | $1.8 \times 10^{-5}$ |

Deserril = methysergide
Antistin = antazoline phosphate
Buscopan = scopalamine butyl bromide
Cantil = B-phenyl-B (N-piperedil)
Spasmamina = diethylaminoethylamine of ethyl ester of phenylethyl-maleic acid
Gemora = mepenzolate bromide propionate of N-butyl.

In general this large series of products is characterized by an endoperitoneal $DL_{50}$ for mice less than those of the various reference materials. In fact while the $DL_{50}$ of commercial products varies from 100–200 mg/kg, that of the products of the invention is about 300 mg/kg, which means the new products are appreciably less toxic than the various known products taken in comparison.

Anti-ulcerative activity was determined in numerous tests including histamine ulcers, contention ulcers, ulcers of the ligature of the pylorus. Some of the products were found to inhibit effectively ulcer formation, no they may be considered useful agents in gastric and duodenal ulcer therapy.

The pharmacological features and the collateral effects in practice overlap those of atropine, so that the products examined are indicated for the therapy of spasms in the amooth musculature of the biliary and uro-genital tracts and of the digestine system as well as for anti-ulcerative agents. These therapeutic applications appear all the more advantageous when allowance is made for the higher therapeutic index of the new drugs as compared with that of atropine.

The following examples illustrate the preparation of novel intermediates such as 2-propyl-4-pentynoic acid and 2-phenyl-4-pentynoate of B-bromethyl, together with details of the general methods A, B, C. These examples are followed by a list of the new products with their corresponding physical properties, and indications of their method of production.

EXAMPLE 1

Preparation of 2-propyl-4-pentynoic acid $$(R = -(CH_2)_2 - CH_3 \text{ and } R' = H)$$

To an ethanol solution of the sodium salt of ethyl propylaceto-acetate, obtained form 34.4 gm of propyl aceto-acetate (0.2 mol) and 4.6 gm of sodium (0.2 mol) in 80 cc of absolute ethanol, there is added in the cold and with stirring 26.16 gm of propargine bromide (0.22 mol). After being left overnight the solution is reflux heated for 3 hours, the inorganic salt formed is filtered off and the filtrate is evaporated to dryness. The residue is taken up with water, extracted with ether, the combined ether extracts are dried and evaporated and the oily residue is fractionated to give 31.8 gm of ethyl 2-phenyl-4-pentynoate which boild at 79°–81 at 0.4 mm. 10 gm of the resulting ester are treated with 100 cc of 15percent ethanolic potassium hydrate, the solution is reflux heated and stirred for 4 hrs. After separation of the solid residue by filtration, the organic filtrate is evaporated to dryness and the residue is taken up with water. After washing with ether the alkaline aqueous suspension is acidified in the cold by dilute acetic acid and extracted with ether.

On evaporation of the ether extracts and fractionation of the oily residue 4.3 gm of an acid boiling at 89° at 0.2 mm is obtained.

EXAMPLE 2

Preparation of 2-phenyl-4-pentynoate of β-bromoethyl.

$$R = -\langle\phantom{O}\rangle \quad \text{and} \quad R' = -CH_2-CH_2-Br$$

To a suspension of 8.2 gm of 2-phenyl-4-pentynoic acid (0.047 mol) in 60 cc of carbon tetra chloride is added 23.30 gm of ethylene bromohydrin (0.188 mol) and 10 drops of concentrated sulphuric acid, followed by reflux heating for 15 hours. After cooling, the reaction mixture is washed with water, with 10 percent sodium bicarbonate, with water again, and finally dried over anhydrous sodium sulphate. The solvent is evaporated in vacuo and the residue fractionated. 9.7 gm of a colorless oil boiling at 121°–123° at 0.05 mm were obtained.

EXAMPLE 3

Preparation of 2-phenyl-4-pentynoate of tropine.

$$R = -\langle\phantom{O}\rangle \quad \text{and} \quad R' = -\boxed{N-CH_3}$$

2.82 gm of tropine (0.02 mol), 0.78 gm of potassium (0.002 mol) and 40 cc of toluol were reflux heated with stirring for 6–7 hours until complete formation of the potassium salt of tropine. To the resulting suspension was added at room temperature a solution in 10 cc of benzol of 3.85 gm of 2phenyl-4-pentyno-chloride (0.02 mol); the mixture was reflux heated and stirred for 3 hours. The resulting inorganic salt was separated by filtration, the organic filtrate was washed with water and extracted with 10 percent dilute hydrochloric acid. After neutralization with bicarbonate of soda the acqueous solution was extracted with ether. The ether solution was dried over anhydrous sodium sulphate and evaporated. The oily residue was fractionated in vacuo, resulting in 1.3 gm of oily material which boild at 147°–149° C at 0.7 mm.

EXAMPLE 4

Preparation of iodo-methylate of 2-phenyl-4-pentynoate of tropine.

0.6 gm of tropine 2-phenyl-4-pentynoate and 0.6 gm of methyl iodide in 3cc of methyl alcohol were heated under pressure for 12 hrs. at 70° C.

On cooling the quaternized salt precipitated, was filtered off and purified by crystallization by methanol.

Melts at 243°–244° C.

EXAMPLE 5

Preparation of 2-phenyl-4-pentynoate of Di-iso-propyl-amino-ethyl.

The mixture of 5.22 gm of 2-phenyl-4-pentynoic acid (0.03 mol), 1.17 gm of potassium (0.03) mol and 4.91 gm of iso-propyl-amino -ethyl-chloride (0.03 mol) in 60cc of absolute isopropanol were reflux heated for 3 hrs.

After filtration the organic filtrate was evaporated, the residue taken up with water and extracted with ether. The ether solution, after washing with water and dilute sodium bicarbonate followed by drying over anhydrous sodium sulphate, was evaporated to dryness and the oily residue was fractionated in vacuo, producing 5.7 gm of colorless oil which boils at 131° C at 0.2 mm.

EXAMPLE 6

Preparation of 2-phenyl-4-pentynoate of μ-(N-methyl-N'-piperazinile-etmyl.

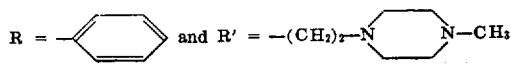

A mixture of 7gm of 2-phenyl-4-pentynoate of B-bromoethyl (0.025 mol) and 2.5 gm of N-methyl-piperazine (0.025 mol) was heated at 130° C with stirring for 7 hrs. After cooling, the resultant material was taken up with water, the mixture washed with ether, made alkaline in the cold state by solid sodium carbonate and finally extracted with ether.

The ether solution was washed with water until it gave a neutral reaction, dried and evaporated. On fractionation in vacuo of the oily residue there was obtained a colorless fraction which boils at 163°–164° C at 0.15 mm.

The following compounds have been obtained by the general method described above:

(1) 2-propyl-4-pentynoate of μ-diethylaminoethyl.

This products is shown under reference 5028: in the table.

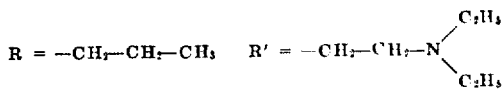

Boiling point 115° at 0.2 mm.
The product was obtained by the general methods A, B and C.

(2) 2-propyl-4-pentynoate of N-ethyl-3-piperidile.

The product is shown under reference 50280 in the table.

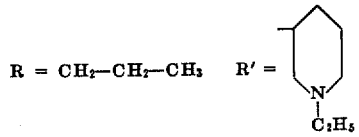

Boiling point 117° at 0.1 mm.
(3) 2-propyl-4-pentynoate of tropine monochlorhydrate.

The product is shown under reference 50229 in the table.

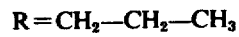

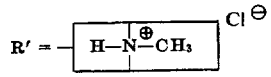

Melting point 207°–209°.
The product was obtained by method A and subsequent salidification with hydrochloric acid.

(4) 2-phenyl-4-pentynoate of β-diethyl-amino-ethyl.

The product is shown under reference 50268 in the table.

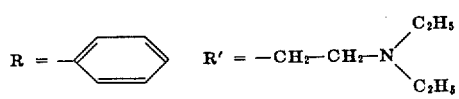

Boiling point 118°–119° at 0.1 mm.
The product was obtained by methods A, B and C.
The monochlorhydrate has a melting point of 109°–110°.

(5) 2-phenyl-4-pentynoate of N-ethyl-3-piperidile.

The product is shown under reference 50276 in the table.

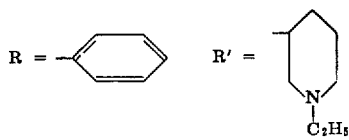

Boiling point 121°–123° at 0.1 mm. The product was obtained by methods A and B. The monochlorhydrate has a melting point of 147°–149°

(6) 2-phenyl-4-pentynoate of tropine

The product is shown under reference 50303 in the table.

R = 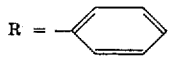   R' = 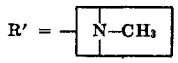

Boiling point 147°–149° at 0.1 mm. The product was obtained by method A. The iodomethylate, shown under reference 50303MJ in the table, has a melting point of 243°–244°.

(7) 2-phenyl-4-pentynoate of β-di-isopropylaminoethyl.

The product is shown under reference 50304 in the table.

R = 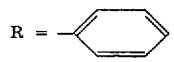   R' = 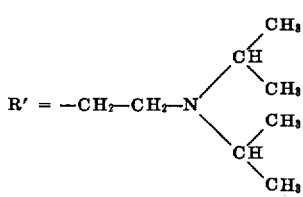

Boiling point 131° at 0.2 mm. The product was obtained by methods A, B and C.

(8) 2-phenyl-4-pentynoate of γ-diethylamino-β,β-dimethyl propyl.

The product is shown under reference 50302 in the table.

R = 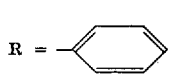   R' = 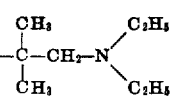

Boiling point 130°–132° at 0.25mm. The product was obtained by the general methods A and B.

(9) 2-phenyl-4-pentynoate of N-methyl-3-piperidile-mono-chlorhydrate.

The product is shown under reference 50307 in the table.

R = 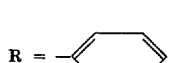   R' = 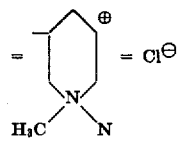

Melting point 185°

The amino-ester from which the chlorhydrate is derived was obtained by the general methods A and B.

(10) 2-phenyl-4-pentynoate of γ-morphline-β,β-dimethyl-propyl.

The product is shown under reference 50312 in the table.

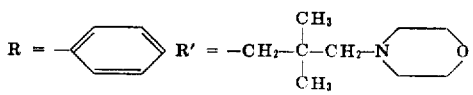

Boiling point 158°159° at 0.15 mm. The product was obtained by the general methods A and B.

(11) 2-phenyl-4-pentynoate of β-(N-piperazinide)-ethyl.

The product is shown under reference 50314 in the table.

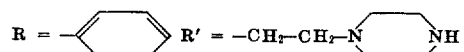

Boiling point 141°–145° at 0.1 mm. The product was obtained by the general method C. The dichlorhydrate was a melting point 167°–169°.

(12) 2-phenyl-4-pentynoate of β-(N-methyl-N'-piperazinile)-ethyl.

The product is shown under reference 50321 in the table.

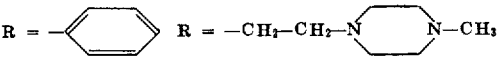

Boiling point 163°–164° at 0.15 mm. The product was obtained by the general methods A, B and C.

(13) N-N'-bis-(2-phenyl-4-pentynoiloxyethyl)-piperazine.

The product is shown under reference 50315 in the table.

R = 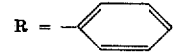

R' = 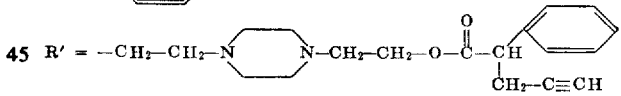

Melting point 111°–113°

The product was obtained by the general methods A, B and C.

(14) 2-phenyl-4-pentynoate of 2-(2'-diethylaminoethoxy)-ethyl.

R = 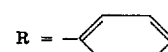   R' = 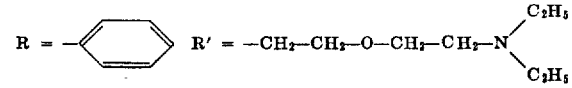

Boiling point 156°–8° at 0.5 mm. The product was obtained by methods A and C.

What we claim is:

1. The compound 2-phenyl-4-pentynoate of tropine, 2-propyl-4-pentynoate of tropine and the physiologically acceptable salts thereof.

2. The physiologically acceptable salts of the compounds of claim 1.

3. The compound according to claim 2 wherein said compound is the iodomethylate of 2-phenyl-4-pentynoate of tropine.

4. The compound according to claim 2 wherein said compound is 2-propyl-4-pentynoate of tropine monochloride.

* * * * *